United States Patent [19]

Hirano

[11] Patent Number: 5,299,051

[45] Date of Patent: Mar. 29, 1994

[54] HOUSING STRUCTURE FOR OPTICAL SCANNING SYSTEM

[75] Inventor: Masakazu Hirano, Tokyo, Japan

[73] Assignee: Asahi Kogaku Kogyo Kabushiki Kaisha, Tokyo, Japan

[21] Appl. No.: 916,694

[22] Filed: Jul. 22, 1992

[30] Foreign Application Priority Data

Jul. 23, 1991 [JP] Japan .................................. 3-85736

[51] Int. Cl.⁵ .............................................. G02B 26/10
[52] U.S. Cl. ..................................... 359/216; 359/196
[58] Field of Search ............... 359/216, 217, 218, 219, 359/507, 508, 196

[56] References Cited

U.S. PATENT DOCUMENTS

| 4,553,229 | 11/1985 | Wakamiya . |
| 4,868,673 | 9/1989 | Negoro . |
| 5,033,821 | 7/1991 | Hama et al. . |
| 5,066,987 | 11/1991 | Minefuji et al. . |
| 5,157,536 | 10/1992 | Uematsu ........................... 359/217 |

FOREIGN PATENT DOCUMENTS

| 124016 | 5/1988 | Japan ................................... 359/217 |
| 9318 | 1/1991 | Japan ................................... 359/217 |

Primary Examiner—Edward K. Look
Assistant Examiner—F. David Lopez
Attorney, Agent, or Firm—Sandler Greenblum & Bernstein

[57] ABSTRACT

A housing structure for an optical scanning system unit of an imaging device. Various optical elements which relate to a scanning operation effected by a light beam are disposed thereon with a predetermined positional relationship. The housing structure includes a dynamic deflector disposition area in which the dynamic deflector is disposed, and an optical element disposition area which is formed stepwise with respect to the dynamic deflector disposition area though a vertical wall and in which the optical elements are disposed.

12 Claims, 3 Drawing Sheets

HOUSING STRUCTURE FOR OPTICAL SCANNING SYSTEM

BACKGROUND OF THE INVENTION

The present invention relates to a housing structure for an optical scanning system of an imaging device for scanning the peripheral surface of a photoconductive member with a laser beam modulated based on image data and deflected by a dynamic deflecting means, such as a polygonal mirror, and forming an image on a recording paper with employing an electrophotographic process, wherein optical elements relating to the scanning operation effected by the laser beam are disposed in the housing structure with a predetermined positional relationship.

There are imaging devices employing an electrophotographic process for providing a hard copy by printing or drawing data output from a computer, word processor, facsimile and the like on a recording paper.

The electrophotographic process is such that a photoconductive material on the surface of a photoconductive member is uniformly charged, a latent image is formed by a portion of the photoconductive material from which electric charges are removed by exposure. The latent image is developed by adhering toner thereto (made to a toner image), and then the thus obtained toner image is transferred to a recording paper and further fixed thereon by a fixing unit.

One of such imaging devices employs an optical scanning system for causing the light beam carrying image data to perform a scanning and exposing operation. One of the optical scanning systems is a laser scanning system which is arranged such that a laser beam emitted from a semiconductor laser and corresponding to an input signal is irradiated onto a photoconductive member through optical elements such as a collimator lens, polygonal scanner, fθ lens, reflection mirror and the like.

In the above laser scanning system, the respective optical elements, in particular, a semiconductor laser, cylindrical lens, polygonal scanner and fθ lens must be disposed with relative distance, relative angle and the like with pinpoint accuracy provided therebetween.

To achieve the aforesaid disposition, an optical scanning system is preferably composed of these optical elements, each the elements are disposed on a base member with a predetermined accuracy and mounted on the chassis of the imaging device as a unit. Such an assembly enhances workability in assembly and maintenance.

The base member is required to have a high rigidity so that it cannot be easily deformed, to thereby ensure that the relative distance, angle and the like between the respective optical elements are not disturbed.

SUMMARY OF THE INVENTION

It is therefore an object of the present invention to provide a housing structure for an optical scanning system which can be very rigidly arranged and enables optical elements to be functionally disposed.

For the above purpose, according to the present invention, there is provided a housing structure for an optical scanning system arranging a dynamic deflecting means and optical elements with predetermined positional relationships, which comprises:

a first disposition area in which said dynamic deflecting means is disposed; and a second disposition area which is formed stepwise with respect to said first disposition area through a vertical wall and in which said optical elements are disposed.

With the aforementioned arrangement, since the first disposition area is formed stepwise with respect to the second disposition area through the vertical wall, the housing structure can be rigidly arranged while retaining a light weight, and enabling the optical elements to be disposed with pinpoint accuracy.

Further, by mounting the optical elements on the lower surface of a second disposition area, less dust accumulates on them and the dust protection structure can be simplified.

According to another aspect of the present invention, there is provided a housing structure, for an optical scanning system, which enables the arrangement of a dynamic deflecting means and optical elements with predetermined positional relationship. The housing structure includes a first surface;

a second surface which is different from said first surface; and a third surface which connects said first and second surfaces. The dynamic deflecting means is mounted on the first surface while the optical elements are mounted on the second surface.

An opening for passing a light beam deflected by said dynamic deflecting means is formed on the third surface.

DESCRIPTION OF THE ACCOMPANYING DRAWINGS

DESCRIPTION OF THE EMBODIMENTS

An embodiment of the present invention will be described below with reference to the drawings.

Figure 1:
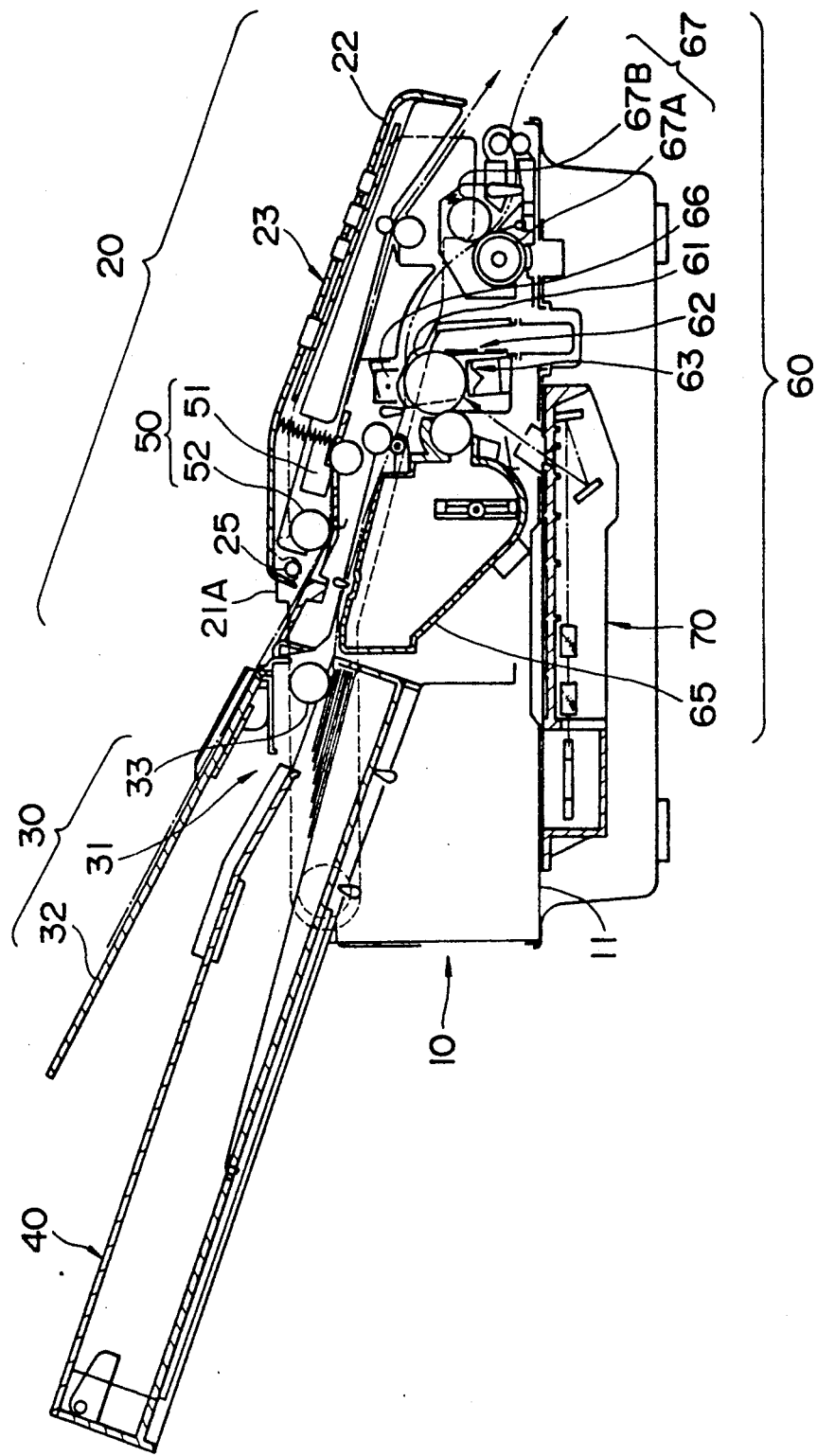
FIG. 1 is a side view schematically showing an electrophotographic facsimile device as an imaging device to which an embodiment of a housing structure for an optical scanning system according to the present invention is applied.

FIG. 1 is a side view schematically showing an electrophotographic facsimile device as an imaging device to which an embodiment of an optical scanning system unit according to the present invention is applied, wherein the right side of the FIG. corresponds to the front of the facsimile device.

The illustrated facsimile device includes a paper supply unit 30 at the upper rear end of a main body 10 for supplying into the device a recording paper for received information or a document for transmitting information. The upper front portion of the device, contiguous to the paper supply unit 30, is composed of an upper arrangement member 20, supported by an arm 21A, at the end on the paper supply unit 30 side (rear side) of the main body 10.

The paper supply unit 30 is composed of a cassette mounting portion 31 detachably mounted to a recording paper cassette 40 accommodating cut-sheet papers as information receiving recording papers, and a document holder 32 for information transmitting documents mounted in front of the cassette mounting portion 31 (right side in FIG. 1). A recording paper introduction roller 33 is disposed at the position corresponding to the upper front end of the recording papers accommodated in the recording paper cassette 40 mounted to the cassette mounting portion 31.

The upper arrangement member 20 has an upper surface formed as an inclined surface gradually inclining downward toward the front end of the device, and a portion of the inclined surface is arranged as an operation unit 23 which includes a display panel, operation buttons and the like disposed thereon.

A document reading mechanism is disposed in the upper arrangement member 20, and composed of a reading head 50 including a reading sensor 51 and a document introduction roller 52 disposed on the document holder 32 side in the vicinity of the reading sensor 51, and a document feed path formed in confrontation with the reading head 50. A document placed on the document holder 32 of the paper supply unit 30 is introduced into the upper arrangement member 20 by the document introduction roller 52, fed along the path shown by the dot-dash-line in FIG. 1, information written on the document is read by the reading sensor 51, and then the document is discharged through a document discharge port 11A defined to the front surface of the front end 11 of the main body 10.

A recording unit 60 as an imaging unit including various operation mechanisms for executing an electrophotographic process is provided with the main body 10.

The recording unit 60 is composed of a cleaning mechanism for cleaning toner remaining on the surface of a photoconductive drum 61 by abutting a blade formed of an elastic member against the surface thereof, a corona charger 63 for uniformly charging the photoconductive material on the surface of the photoconductive drum 61, an optical scanning unit 70 for exposing and scanning the surface of the photoconductive drum 61 with a laser beam modulated (turned ON and OFF) in response to image data, a development unit 65 for adhering toner to a portion of the photoconductive material from which electric charges are removed by exposure and made to a latent image and making the latent image to a toner image, a transfer charger 66 for charging a recording paper and transferring the toner image thereon, each unit disposed about the photoconductive drum 61 driven in rotation at a predetermined circumferential speed by a drive motor not shown. Further, a fixing unit 67 is disposed at a location to which the recording paper transferred with the toner image is fed, and composed of a heat roller 67A heated to a predetermined temperature and a press roller 67B disposed obliquely upward of the heat roller 67A on the front end side of the facsimile device and pressed against the heat roller 67A.

The recording papers accommodated in the recording paper cassette 40 are sequentially introduced into a recording paper path from the uppermost one thereof by the rotation of the recording paper introduction roller 33, while the surface of the photoconductive drum 61 is main scanned (exposed) by a laser beam supplied from the optical scanning unit 70 and modulated in response to received print or image data as well as the photoconductive drum 61 is rotated (sub-scanned) so that an electrostatic latent image is formed on the surface of the photoconductive drum 61. This latent image is developed into a toner image by the development unit 65, the toner image is transferred to a recording paper fed along a path shown in FIG. 1 by the two-dot-and-dash line and charged by the transfer charger 66. Further, the toner image is fixed to the recording paper by the fixing unit 67, and then the recording paper is discharged through the front end of the facsimile device.

Figure 2:
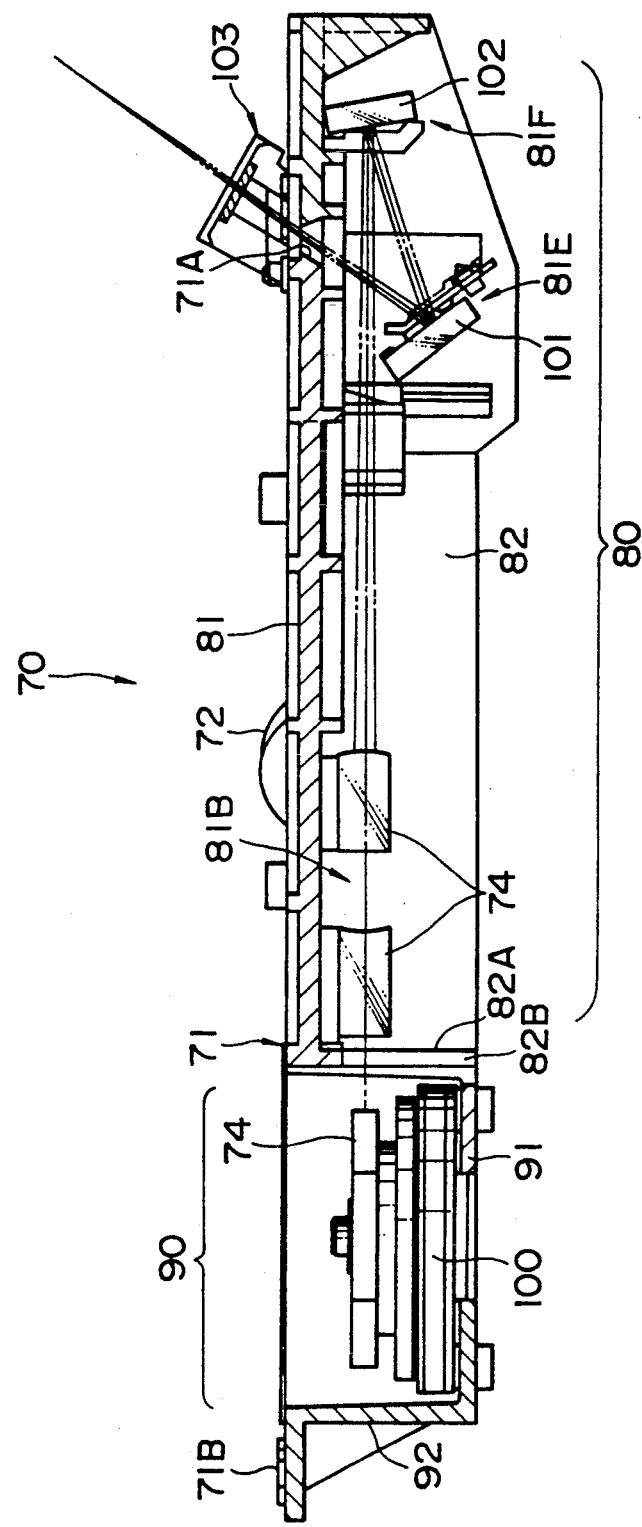
FIG. 2 is a longitudinal cross sectional view of the optical scanning system unit.
Figure 3:
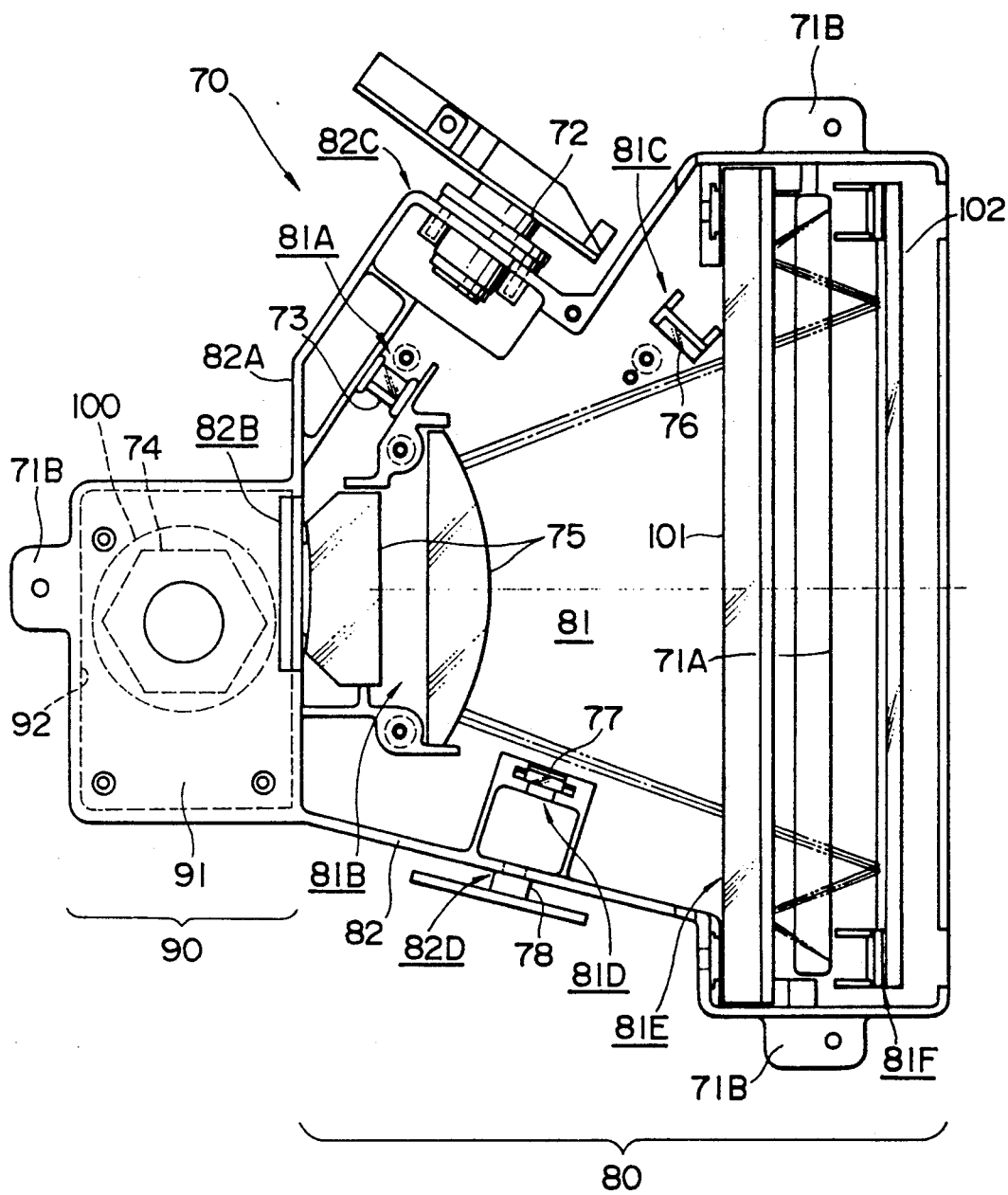
FIG. 3 is a lower plan view of the optical scanning system unit.

As shown in the longitudinal cross sectional view of FIG. 2 and the lower plan view of FIG. 3, the optical scanning system unit 70 includes optical elements such as a semiconductor laser 72, cylindrical lens 73, polygonal mirror 74, fθ lens 75, reflection mirror 76, cylindrical lens 77, beam scanning position sensor 78, first mirror 101, and second mirror 102, each of which are disposed at a predetermined position on a housing 71 with pinpoint accuracy so that they keep predetermined relative distances and angles, respectively.

The housing 71 is composed of an optical element mounting portion 80 as an optical element diposition area and a polygonal mirror mounting region 90 as a polygonal mirror disposition area located on the backside of the optical element mounting portion 80 and arranged integrally therewith.

The optical element mounting portion 80 is composed of a flat base 81 and a wall 82 having a predetermined height and surrounding the flat base 81.

A cylindrical lens mounting portion 81A, fθ lens mounting portion 81B, reflection mirror mounting portion 81C, lens mounting portion 81D, first mirror mounting portion 81E, and second mirror mounting portion 81F are formed, respectively, on the lower surface of the base 81.

The cylindrical lens mounting portion 81A is located within the laser beam path from the semiconductor laser 72 to the polygonal mirror 74 to be described later.

The fθ lens mounting portion 81B is formed at a position adjacent to a wall 82A as the rear side portion of the wall 82 of the base 81.

The reflection mirror mounting portion 81C is formed at one end of the region in which a laser beam is reflected by the polygonal mirror 74.

The lens mounting portion 81D is formed on the side of the laser beam scanning range opposite the side of the reflection mirror mounting portion 81C.

The first and second mirror mounting portions 81E and 81F are formed on the front end of the housing 71 (on the right side in FIG. 3).

Further, a hole 71A is defined in the base 81 between the first mirror mounting portion 81E and the second mirror mounting portion 81F and a scanning laser beam can pass through the hole 71A. A cover 103 composed of a cover glass is disposed on the upper surface of the hold 71A and the portion of the cover 103 through which the laser beam passes is made transparent.

The optical element mounting portion 80 has a laser mounting portion 82C formed at a predetermined position on the outside surface of the wall 82 located on one side of the base 81, and the semiconductor laser 72 is mounted to the laser mounting portion 82C. Further, the optical element mounting portion 80 also has a sensor mounting portion 82D formed at a predetermined position on the outside surface of the wall 82 located on the other side of the base 81 and the beam scanning position sensor 78 is mounted to the sensor mounting portion 82D.

The semiconductor laser 72 is mounted to the laser mounting portion 82C at a position such that a laser beam emitted from the semiconductor laser 72 is directed to the polygonal mirror 74 mounted to the polygonal mirror mounting portion 90. Although not shown, the semiconductor laser 72 is arranged as a unit together with a collimator lens attached thereto.

The cylindrical lens 73 is mounted to the cylindrical lens mounting portion 81A so that the cylindrical lens 73 linearly condenses a laser beam from the semiconductor laser 72 to the polygonal mirror 74 in a direction perpendicular to the rotational axis of the polygonal mirror 74.

The fθ lens 75 is mounted to the fθ lens mounting portion 81B so that the optical axis plane of the lens 75 coincides with the scanning plane of the semiconductor laser 72 (the scanning light path of the semiconductor laser 72 is contained in the optical axis plane of the fθ lens 75).

The reflection mirror 76 is mounted to the mirror mounting portion 81C at a predetermined angle so that a laser beam at the end of the scanning range is reflected toward the beam scanning position sensor 78, to be described later.

The cylindrical lens 77 is mounted to the lens mounting portion 81D so that the lens 77 linearly condenses a laser beam reflected from the mirror 76 to the beam scanning position sensor 78 in the direction perpendicular to the moving direction of the laser beam in a laser beam path.

The beam scanning position sensor 78 is mounted to the sensor mounting portion 82D at the position where the sensor 78 can detect a laser beam located at the end of a scanning range reflected by the mirror 76 and incident on the sensor 78 through the cylindrical lens 77.

The first mirror 101 is mounted to the first mirror mounting portion 81E at a predetermined angle so that the reflection surface of the first mirror 101 is located within the optical axis plane of the fθ lens 75, and a laser beam passing through the fθ lens 75 is reflected downward at a predetermined angle and directed to the second mirror 102 to be described later.

The second mirror 102 is mounted to the second mirror mounting portion 81F at a predetermined angle so that the reflection surface of the second mirror 102 is located within the light path of a laser beam reflected by the first mirror 101, and a laser beam reflected by the first mirror 101 is reflected to the hole 71A.

The fθ lens 75, and first and second mirrors 101 and 102 mounted to the fθ lens mounting portion 81B and first and second mirror mounting portions 81E and 81F, are disposed symmetrically with respect to the center line of the scanning range shown by a dot-dash line in FIG. 3, respectively.

The polygonal mirror mounting portion 90 has a base 91 extending from the lower end of the rear wall 82A of the optical element mounting portion 80 to the rear end of the mounting portion 90 in parallel with the base 81 of the optical element mounting portion 80. A polygonal mirror drive motor 100 is mounted on the upper surface of the base 91 and the polygonal mirror 74 is coupled to the spindle of the motor 100. More specifically, the polygonal mirror mounting portion 90 is separated from the optical element mounting portion 80 by the wall 82A and formed stepwise with respect to the optical element mounting portion 80.

The polygonal mirror 74 is mounted to the polygonal mirror mounting portion 90 at a height which coincides with the height of the optical axis plane of the fθ lens 75 including the light path of the semiconductor laser 72 mounted to the laser mounting portion 82 of the optical element mounting portion 80.

The polygonal mirror mounting portion 90 is surrounded by a vertical wall 92 and the upper end surface of the wall 92 substantially coincides with the upper surface of the optical element mounting portion 80 (the upper surface of the base 81).

A hole 82B is defined in the wall 82A by which the optical element mounting portion 80 is separated from the polygonal mirror mounting portion 90, and a laser beam is emitted from the semiconductor laser 72 to the polygonal mirror 74 through the hole 82B and deflected by the polygonal mirror 74.

In the optical scanning system unit 70 arranged as described above, the semiconductor laser 72, cylindrical lens 73, polygonal mirror 74, fθ lens 75, reflection mirror 76, cylindrical lens 77, beam scanning position sensor 78, first mirror 101, and second mirror 102 are mounted to the optical element mounting portion 80 of the housing 71 so that they have predetermined positional relationships, and further the polygonal mirror 74 is mounted to the polygonal mirror mounting portion 90. With this arrangement, a laser beam emitted from the semiconductor laser 72 reaches the polygonal mirror 74 through the cylindrical lens 73 and the hole 82B defined to the wall 82A and performs a scanning operation within the range of a predetermined angle by being deflected on the peripheral surface of the polygonal mirror 74, while polygonal mirror 72 rotates. The scanning laser beam passing through the hole 82B enters the optical element mounting portion 80 through the hole 82B, where a scanning speed of the laser beam is corrected by the fθ lens 75 so that it has a constant speed in proportion to a deflection angle. Thereafter, the laser beam is reflected by the first and second mirrors 101 and 102 and returned at a predetermined angle through the hole 71A defined in the base 81 of the optical element mounting portion 80.

Further, a laser beam at the end of the scanning range is reflected by the mirror 76 and reaches the beam scanning position sensor 78 through the cylindrical lens 77 and is detected by the sensor 78.

A signal generated by the beam scanning position sensor 78 is used as a horizontal synchronization signal when a laser beam emitted from the semiconductor laser 72 is modulated. More specifically, when the beam scanning position sensor 78 detects the laser beam, a position to be scanned by the laser beam is identified, and thus when this position is used as a reference for determining a timing at which a laser beam is modulated, images can be printed at the same position in a horizontal direction (a scanning direction with a laser beam).

The housing 71 of the optical scanning system unit 70 is arranged such that mounting seats 71B . . . 71B project from the right and left sides of the front end portion of the optical element mounting portion 80 and from the upper end of the rear wall of the polygonal mirror mounting portion 90, respectively, and the upper surfaces of these mounting seats 71B are located on the same plane.

Consequently, the optical scanning system unit 70 arranged as described above is mounted on the lower surface of the chassis 11 of the facsimile device by clamping means such as screws or the like passing through the mounting seats 71B so that a laser beam returned at a predetermined angle through hole 71A, to be described later, is directed to the photoconductive drum 61.

A laser beam passing hole is defined is the chassis 11 of the imaging device on which the optical scanning system unit 70 is mounted. The hole can be covered with a cover 103 and is located at a position corresponding to the position of the 71A defined is the base 81. The upper surface of the housing 71 (i.e., the optical scanning system unit) is mounted to the lower surface of the chassis 11 substantially in intimate contact therewith.

According to the optical scanning system unit 70 arranged as described above, since the housing 71 of the unit 70 is integrally composed of the optical element mounting portion 80 and polygonal mirror mounting portion 90 through the wall 82A on the rear side of the optical element mounting portion 80, the optical elements can be rationally disposed in the housing 71 and the optical scanning system unit 70 can be rigidly arranged. Further, since the optical elements are mounted on the lower surface of the optical element mounting portion 80 and the optical scanning system unit 70 is mounted on the lower surface of the chassis 11, less dust accumulates on the optical elements and thus a dust protection structure can be simplified.

What is claimed is:

1. A housing structure for an optical scanning system arranging a dynamic deflecting means and optical elements with predetermined positional relationship, which comprises:
    a first disposition area in which said dynamic deflecting means is disposed; and
    a second disposition area which is formed stepwise with respect to said first disposition area through a vertical wall and in which said optical elements are disposed;
    wherein said dynamic deflecting means is disposed on an upper surface of said first disposition area, and said optical elements are disposed on a lower surface of said second disposition area, said upper surface of said first disposition area being relatively positioned a step lower than said lower surface of said second disposition area.

2. The housing structure according to claim 1, wherein said dynamic deflecting means comprises a polygonal mirror.

3. The housing structure according to claim 1, wherein said first disposition area is communicated with said second disposition area through a hole defined in said vertical wall through which a light beam passes.

4. The housing structure according to claim 3, wherein said first and second disposition areas are surrounded by a wall having substantially the same height as that of said vertical wall.

5. The housing structure according to claim 4, wherein said optical elements include a reflection member for leading a light beam to the outside of said second disposition area by bending the optical path thereof.

6. The housing structure according to claim 5, wherein said wall surrounding said first disposition area has an upper end surface and said second disposition area has a back surface; wherein said upper end surface and said back surface are formed on substantially the same plane.

7. The housing structure according to claim 6, wherein a hole is defined in said second disposition area, and said reflection member leads a light beam to the outside of said second disposition area through said hole which is defined in said second disposition area.

8. In an imaging device for scanning the peripheral surface of a photoconductive drum with a laser beam modulated by image data and reflected by a dynamic deflecting means and forming an image on a recording paper by an electrophotographic process, an optical scanning system unit comprises a housing and optical elements relating to a scanning operation effected by the laser beam, said optical elements being disposed in said housing with predetermined positional relationship, and said housing further comprises:
    a dynamic deflecting means disposition area in which said dynamic deflecting means is disposed; and
    an optical element disposition area which is formed stepwise with respect to said dynamic deflecting means disposition area through a vertical wall and in which said optical elements are disposed;
    wherein said dynamic deflecting means is disposed on an upper surface of said dynamic deflecting means disposition area, and said optical elements are disposed on a lower surface of said optical element disposition area, said upper surface of said dynamic deflecting means disposition area being relatively positioned a step lower than said lower surface of said optical element disposition area.

9. The housing structure according to claim 8, wherein said dynamic deflecting means comprises a polygonal mirror.

10. A housing structure for an optical scanning system arranging a dynamic deflecting means and optical elements with predetermined positional relationship, which comprises:
    a first mounting portion having an upper surface and a lower surface;
    a second mounting portion, formed stepwise with respect to said first mounting portion, and having an upper surface and a lower surface; and,
    a third surface which connects said first and second mounting portions, wherein said dynamic deflecting means is mounted on said upper surface of said first mounting portion, while said optical elements are mounted on said lower surface of said second mounting portion, and
    wherein an opening for passing a light beam deflected by said dynamic deflecting means is formed on said third surface.

11. The housing structure according to claim 10, wherein said first and second surfaces are displaced with respect to each other in the direction perpendicular to the optical path of said optical scanning system.

12. The housing structure according to claim 10, wherein said dynamic deflecting means comprises a polygonal mirror.

* * * * *